US012697759B2

(12) United States Patent
Rossi et al.

(10) Patent No.: US 12,697,759 B2
(45) Date of Patent: Aug. 4, 2026

(54) GUILLOTINE OBTURATION VALVE FOR INJECTION MOLDING

(71) Applicant: INGLASS S.P.A., San Polo di Piave (IT)

(72) Inventors: Massimo Rossi, San Polo di Piave (IT); Alessandro Dario, San Polo di Piave (IT); Massimo Bisetto, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 0 days.

(21) Appl. No.: 18/721,674

(22) PCT Filed: Sep. 14, 2023

(86) PCT No.: PCT/IB2023/059119
§ 371 (c)(1),
(2) Date: Jun. 19, 2024

(87) PCT Pub. No.: WO2024/095074
PCT Pub. Date: May 10, 2024

(65) Prior Publication Data
US 2025/0256441 A1      Aug. 14, 2025

(30) Foreign Application Priority Data

Nov. 4, 2022    (IT) ........................ 102022000022638

(51) Int. Cl.
*F16K 3/02* (2006.01)
*B29C 45/23* (2006.01)
(Continued)

(52) U.S. Cl.
CPC .......... *B29C 45/23* (2013.01); *B29C 45/2806* (2013.01); *B29C 45/30* (2013.01);
(Continued)

(58) Field of Classification Search
CPC ............ B29C 45/23; B29C 2045/2813; B29C 2045/2855; B29C 45/281; B29C 45/30;
(Continued)

(56) References Cited

U.S. PATENT DOCUMENTS 3,599,290 A * 8/1971 Garner ................ B29C 45/1606
264/DIG. 83
5,094,270 A * 3/1992 Reimert .................. F16K 3/029
251/328
6,056,536 A 5/2000 Schad et al.

FOREIGN PATENT DOCUMENTS

CN        114193713 A    3/2022
EP        0936964 B1    7/2007

OTHER PUBLICATIONS

International Search Report for PCT/IB2023/059119 Mailed on Jan. 15, 2024.

* cited by examiner

*Primary Examiner* — Kelsey E Cary
(74) *Attorney, Agent, or Firm* — Rivka Friedman

(57) ABSTRACT

An obturation valve is described for controlling a flow of molten material exiting from a nozzle into a mold cavity, comprising a channel for the molten material extending along a first axis, two or more obturating members that are mounted movably along a respective second axis inclined at an acute angle with respect to the first axis and so that a free end of each obturating member can move and converge towards the same point inside the channel. The free ends of the obturating members can join at said point to compose a blocking/closing bulkhead for the molten material.

16 Claims, 3 Drawing Sheets

(51) Int. Cl.
*B29C 45/28* (2006.01)
*B29C 45/30* (2006.01)
*F16K 3/314* (2006.01)
(52) U.S. Cl.
CPC ............ *F16K 3/0281* (2013.01); *F16K 3/029*
(2013.01); *F16K 3/314* (2013.01); *B29C*
*2045/2813* (2013.01); *B29C 2045/2855*
(2013.01)
(58) Field of Classification Search
CPC ... B29C 45/2806; F16K 3/0281; F16K 3/029;
F16K 3/34; F16K 3/32; F16K 3/24
See application file for complete search history.

<u>Fig. 2</u>

GUILLOTINE OBTURATION VALVE FOR INJECTION MOLDING

TECHNICAL FIELD

The invention relates to a guillotine obturation valve for controlling a flow of molten material during injection molding.

BACKGROUND

It is known to control the flow of molten material exiting a nozzle towards a mold cavity via a stem (pin) which is linearly movable back and forth. However, the presence and alternating movement of the stem increases flow distur- bances, creating areas of accumulation and stagnation of the material, so much so that, for example, the color change operation for the injected material requires multiple purge injections with significant waste of material. Oblique stems as in EP520345 have the defect of pushing the material against the internal surface of the channel, compressing it further up to the exit. This squeezing effect causes the appearance of defects on the final piece.

To try to solve the problem, the stem obturator was replaced by a guillotine valve located in the nozzle area. This solution, adopted for the simultaneous opening and closing command of multiple injectors placed in line and controlled by a single actuator, is for example shown in EP1409222 (FIG. 13). However, a single movable guillotine causes the material to be squashed towards the perimeter of the nozzle, which is at a lower temperature, thus causing defects in the molded product.

A better solution, as in EP1064138, is to use two opposing guillotines which have the closing point at the center of the channel, because the temperature is higher there. EP1064138, however, provides two planar guillotines oper- ated by a single actuator located on the distant perimeter of the mold, with considerable complications in the actuation and imprecise control of the position of the guillotines.

SUMMARY

The main object of the invention, defined in the attached claims in which the dependent claims define advantageous variants, is to improve this state of the art.

Particular object is to improve the operation of the mov- able obturating parts.

Another particular object is to improve the performance and/or characteristics of an injector for injection molding.

At least one object is achieved by an obturation valve for controlling a flow of molten material exiting a nozzle into a mold cavity, comprising:

a channel for the molten material extending along a first axis, two or more obturating members that are mounted movably along a respective second axis inclined at an acute angle with respect to the first axis, and so that a free end of each obturating member can move and converge towards a same point inside the channel, so that the free ends of the obturating members can join at said point to compose a blocking/closing bulkhead for the molten material.

The aforementioned configuration of the obturating mem- bers, positioned obliquely with respect to the axis of the injector, has several advantages:

the obturating members take up less space around the injector, therefore it is possible to position the nozzle on a surface of the mold die along an axis that is not perpendicular to the normal to the molding surface (useful in certain applications);

the robustness of the mold die increases, thanks to the progressive distancing of the seat of the obturating members from the molding surface, where there act pressure forces, due to the injected molten material, which induce bending and stress concentrations within the die. If these stresses act on a small mold section they could induce fractures;

the more compact structure of the obturating members allows the injection point to be placed inside deep recesses in the mould, the cooling or heating circuits can be positioned closer to the nozzle, passing between the obturating members and the molding surface, for better thermal condition- ing of the nozzle;

the sliding seat of the obturating members is less influ- enced by the pressure that the molten material exerts on them (obturating members that move in a plane orthogonal to the axis of the injector could be com- pressed and therefore slide less easily);

the obturating members are less thermally influenced by the conditions of the molding surface, being contained in a larger section of the mold with greater thermal inertia.

In particular, to give symmetry to the forces involved, said acute angle is equal for all the obturating members.

The obturating members may have a circular, rectangular, prismatic or other cross-section; and/or comprise a heating device, integrated e.g. in the body of the obturating member. The heating device may be an electrical resistor, or an inductive coiled heating device, controlled and regulated by a thermocouple.

Said point inside the channel, destination of the free end of the obturating member, may be a point at the center of the channel (i.e. close to the axis of the channel), a point at the periphery of the channel (i.e. close to the walls of the channel, offset with respect to the axis of the channel), or an intermediate point to the two previous conditions.

In the case of two or more obturating members, said point becomes a common convergence point for the translation of the obturating members (and for the second axes).

In general, the obturating members may be linearly mov- able, i.e. only translatable, or may rotate or roto-translate, as long as their free ends are controllably movable to converge towards a same point inside the channel and touch thereat to compose said bulkhead.

In a preferred variant, the valve comprises only two, preferably only linearly movable, obturating members whose respective second axes are arranged as the adjacent sides of a triangle, said convergence point forming the vertex of the two sides of the triangle and said triangle lying in a plane passing through the first axis.

In a preferred variant, the valve comprises three or more, preferably only linearly movable, obturating members whose respective second axes are arranged like the sides of an imaginary pyramid, said point forming the vertex of the pyramid. In a more preferred variant, said imaginary pyra- mid is arranged so that its base intersects the first axis and the channel (the tip of the pyramid faces the mold cavity), more particularly so that its base is orthogonal to the first axis. The base may also be contained in the mold cavity, i.e. the tip of the pyramid faces said channel.

With three or more cooperating obturating members, any temporary operation irregularity is therefore less likely to block the molding process, and the valve continues to operate achieving a new equilibrium condition.

The use of three obturating members is a good compromise between construction simplicity and the need to reduce the areas of stagnation of molten material in front of the nozzle tip and along the hot runner which are detrimental to molding. In fact, three or more obturating members allow guaranteeing a good uniformity of thickness of the molten material in front of the nozzle tip, thus guaranteeing uniform heating of such material and limiting local cooling phenomena;

because three obturating members "cut" the flow of molten material effectively, without compressing it, even when the flow cools and becomes more viscous;

because during the opening of the obturating members there is a homogeneous flow of molten material, limiting or eliminating the effect of subdivision of the flow around the obturating members not yet completely retracted from said convergence point.

In a preferred variant, the valve comprises for each obturating member a means or drive adapted to move such obturating member independently of the other obturating members. In a more preferred variant, the valve comprises a single means or drive for moving all the obturating members of the valve simultaneously towards said point or away from said point. In particular, the valve comprises means for synchronizing the movement of the obturating members from and towards said convergence point.

Said means for synchronizing and/or said single means or drive may have various embodiments. In a preferred variant for this purpose the valve comprises:

a rotatable member placed near the nozzle, and a portion of one or each obturating member is directly coupled to the rotatable member such that a rotation of the rotatable member entails a translation of the obturating member along the second axis from and/or towards said convergence point.

The aforementioned rotatable member may also operate a single obturating member or a subgroup of obturating members of the valve.

The use of three or more obturating members also has an advantage with respect to said rotatable member. With three or more obturating members it is possible to better balance the forces acting on them and/or on the rotatable member, and limit or avoid abnormal wear of the rotatable member. If e.g. an obturating member, due to excessive and unexpected stress, malfunctions, the residual stress is distributed over at least two other obturating members, reducing the possibility of general malfunctioning of the valve.

A valve equipped with a rotatable member has several advantages, because it allows:

to reduce the force and energy necessary to control and maintain the obturation of the channel, i.e. complex and distributed mechanisms as in EP1064138 are avoided;

to reduce the necessary force, so electricity consumption decreases since it is possible to use smaller actuators;

easy maintenance, because its removal can take place without dismantling the mould;

a local actuation of the obturating members which improves their precision.

In a compact preferred variant, the rotatable member extends around (and e.g. also surrounds) the first axis and the channel; in particular the rotatable member comprises a ring which surrounds the first axis and the channel.

In a preferred variant, the rotatable member is rotatably mounted on a fixed (i.e. stationary) member that is fixed relative to the mold and mounted in or on a plate of the mold. Thus the fixed member can be inserted into a seat of the mold plates and easily removed for maintenance.

The fixed member preferably has a substantially toric shape, and/or comprises a surface that makes up a portion of the mold cavity, and/or comprises cooling means (e.g. ducts for cooling fluid), and/or is a one-piece body in which sliding channels are made for the obturating members, or is composed of two matching parts coupled along a joining surface, with seats or channels being made on the joining surface for the linear translation of the obturating members.

In a preferred variant, to move one or each obturating member the rotatable member comprises a (e.g. eccentric or cam) profile to which said portion is slidably coupled, the profile having a development which converts a rotation of the rotatable member into a translation of the obturating member.

The profile has e.g.

a circular development concentric to the rotation axis of the rotatable member, or a spiral development converging towards a rotation axis of the rotatable member.

In a preferred variant, the rotatable member comprises a ring or crown coaxial to the first axis (and e.g. also to said fixed member), and e.g. said profile is a groove or fin or cam in relief obtained in the crown or ring.

The groove or fin or cam may have an increasing height or depth along its length, and/or a distance from the rotation axis of the rotatable member that varies along the length of the profile.

In a preferred variant, the rotatable member has a rotation axis which is parallel to the first axis, in particular for maximum compactness the rotatable member has a rotation axis coaxial to the first axis, or orthogonal to a plane passing through, and incident on, the first axis.

In a preferred variant, all the obturating members of the valve are connected to the rotatable member.

In a preferred variant, the valve comprises an elastic means adapted to generate a force to push one or each obturating member towards said point or away from said point.

One or each obturating member may also roto-translate (or translate on itself) during its movement from and/or towards said point. In particular, a portion of the obturating member, or said coupled portion of the obturating member, is connected to the rotatable member so that a rotation of the rotatable member entails a translation of the obturating member along the second axis and also a rotation of the obturating member from, and/or towards, said point. More specifically, the rotation of the obturating member occurs about said second axis.

BRIEF DESCRIPTION OF THE DRAWINGS

The advantages of the invention will be even clearer from the following description of a preferred valve, wherein.

DETAILED DESCRIPTION

In the figure equal members are indicated by equal numbers, and in order not to crowd the drawings sometimes only some numbers are shown.

Figure 1:
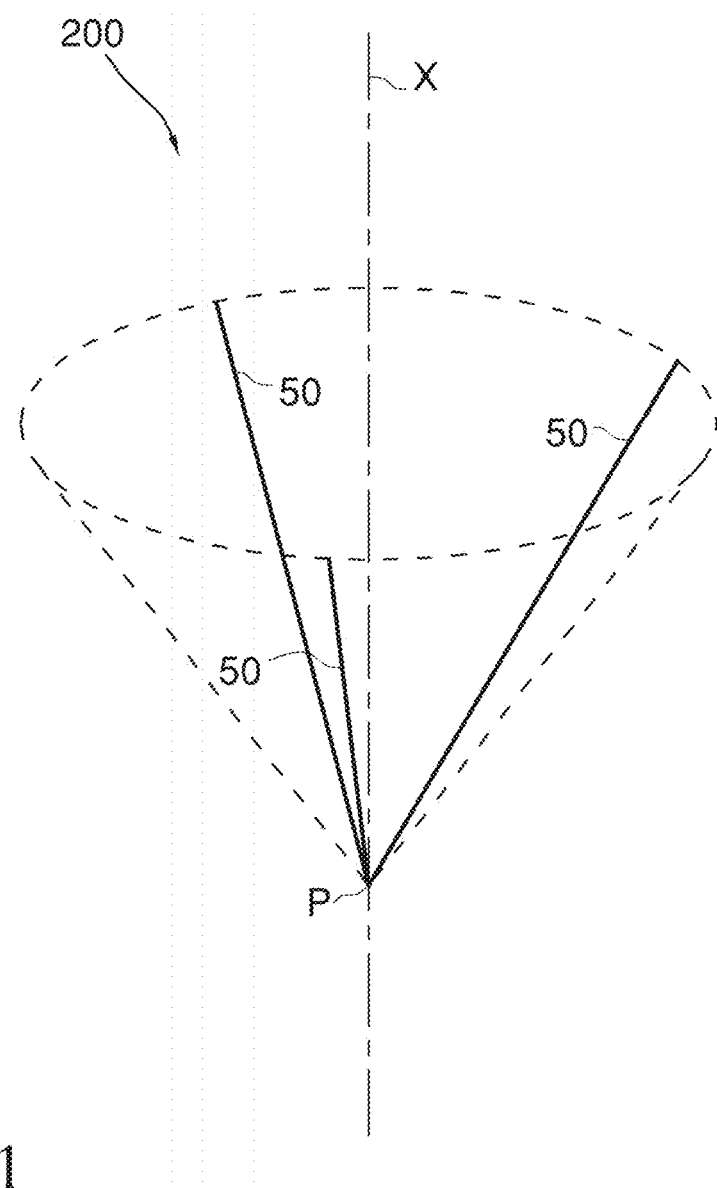
FIG. 1 shows a general geometric scheme for obturating members.

FIG. 1 shows a three-dimensional geometric scheme 200 for a preferred arrangement of obturating members according to the invention.

An X axis represents the axis of a channel 18 for molten material (see also FIG. 2) which extends linearly and can be throttled by an occlusion valve 30. The X axis is also the axis of an imaginary cone 202 in which an imaginary pyramid with a regular triangular base can be inscribed. The tip of the cone 202 identifies a convergence point P at the center of the channel 18.

The valve 30 comprises obturating members 50 arranged as, and sliding linearly along, the edges of the pyramid, three in the illustrated example. The number of obturating members 50 may be greater than three, choosing for example a pyramid with a base polygon other than the triangle and e.g. regular. An irregular pyramid may also be chosen as the imaginary pyramid.

The number of obturating members 50 may also be two upon choosing, instead of a pyramid, a triangle belonging to a plane passing through the X axis and having a vertex at P. In this case the obturating members 50 are arranged along adjacent sides of the triangle, the convergence point P being a common vertex thereof.

Figure 2:
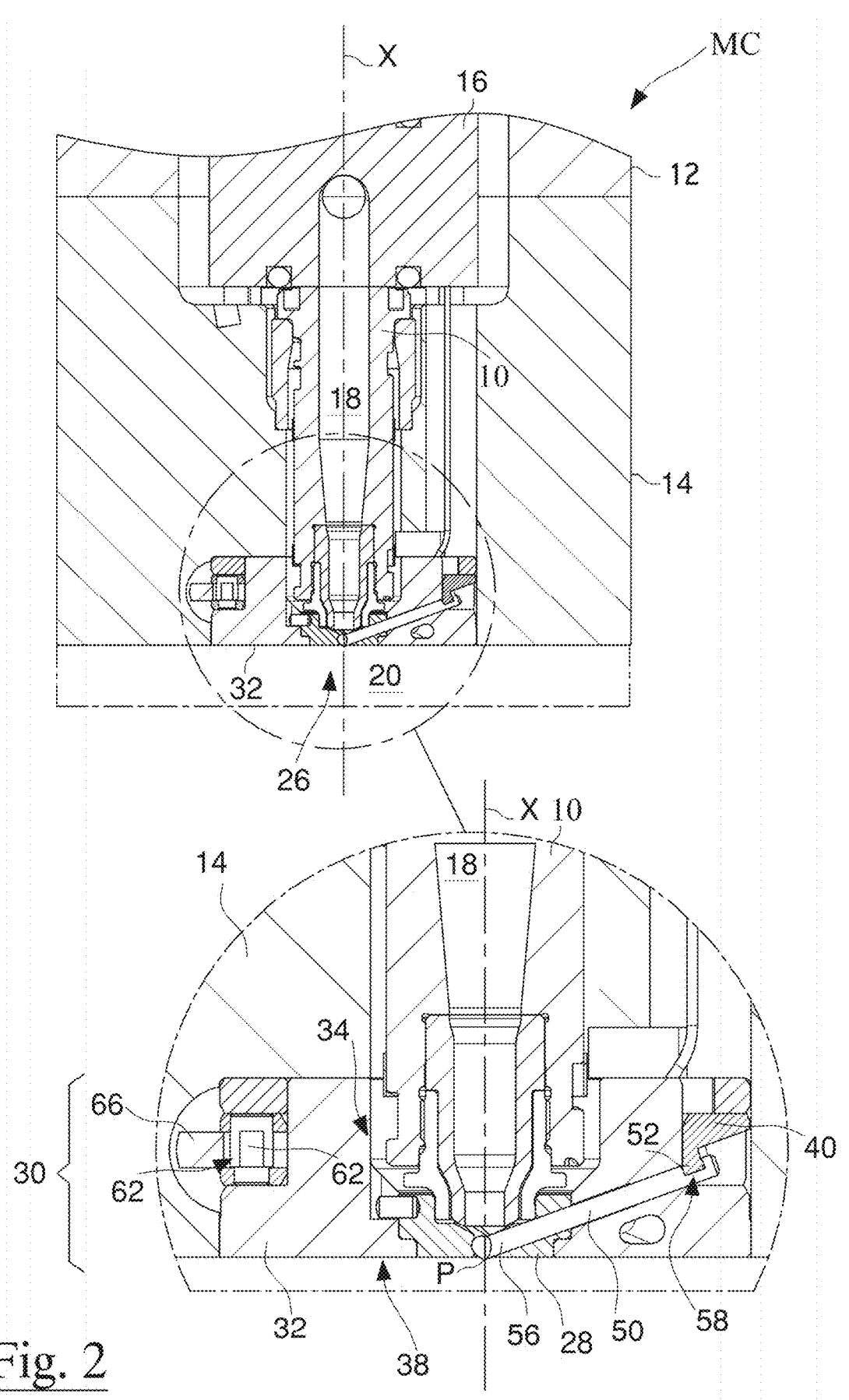
FIG. 2 shows a cross-sectional view of an obturation valve.

FIG. 2 shows the practical implementation of the scheme of FIG. 1 in a mold MC.

The mold MC comprises an injector 10 which is enclosed within mold plates 12, 14 clamped against each other. The injector 10 is connected to a known manifold 16 to receive molten material and convey it, via the channel 18, towards a nozzle 26 from which it is injected into a mold cavity 20. At the nozzle 26 the channel 18 extends linearly along the X axis and can be throttled by an occlusion valve 30.

Figure 3:
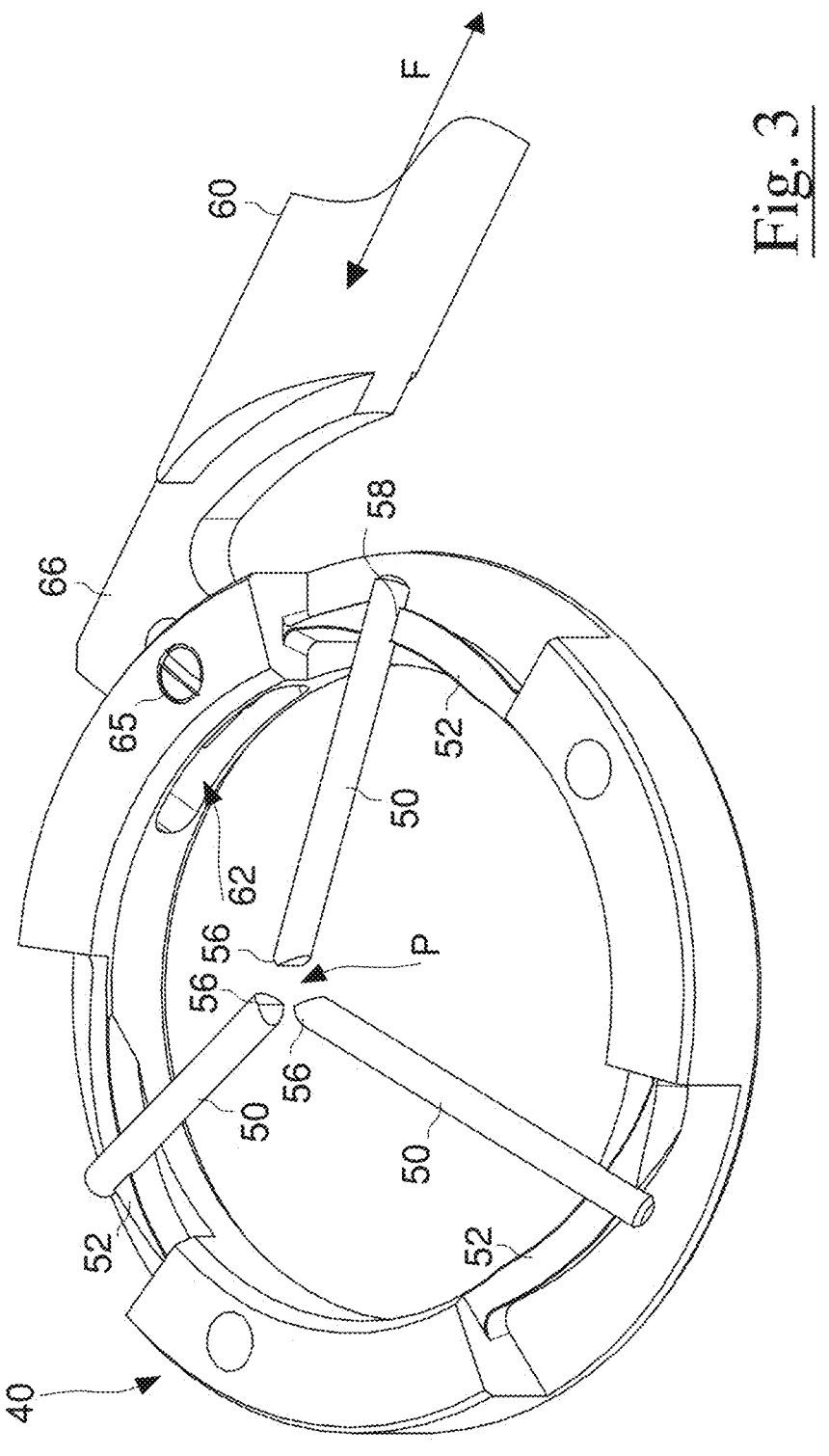
FIG. 3 shows a partial three-dimensional view of a drive for obturation valve.

The valve 30 comprises the obturating members 50 and they are mounted to slide linearly. Preferably the obturating members 50 are all equal and made e.g. such as pins or lamellae (see also FIG. 3), but not necessarily.

The obturating members 50 of FIG. 2 are arranged along the edges of a regular pyramid with a triangular base and converge towards a convergence point P at the center of the channel 18 in proximity of the outlet of the channel 18 inside the cavity 20, as in the scheme of FIG. 1.

The arrangement of the obturating members 50 allows them to slide linearly towards the point P until their free tips or ends 56 touch each other. As the obturating members 50 approach the convergence point P, they form a bulkhead that progressively closes the channel 18. When the tips 56 join together at the point P, the channel 18 is completely closed and the molten material can no longer pass inside the cavity 20 (closing phase of the channel 18).

A preferred operation for the obturating elements 50 is now described.

The valve 30 comprises a body 32 of cylindrical or toric shape which is fixed, by known means, to the plate 14 and faces the cavity 20. The body 32 has a central pass-through cavity 34 in which the nozzle tip 28 and the end of the injector 10 are placed. The nozzle tip 28 abuts internally against the body 32, which has an optional surface 38 which participates in composing the mold cavity.

The X axis coincides with the axis of the body 32, and the body 32 comprises internal seats or cavities within which the obturating members 50 are slidably mounted. Optionally and advantageously the surface 38 may be variously shaped or, at the bottom of the body 32, a plate or a shaped element may be added to make up the mold cavity.

An annular-shaped rotatable member 40 (see also FIG. 3) is mounted coaxially on the body 32 so as to be able to rotate with respect to the body 32. The surface of the rotatable member 40 facing the cavity 20 (the surface opposite to the plates 12, 14) exhibits three profiles 52, e.g. fins or profiles in relief or cams, having a longitudinal development that follows an arc of spiral, converging towards the center of the rotatable member 40 (i.e. towards the X axis). The profiles 52 are arranged with polar symmetry around the X axis.

Therefore the obturating members 50 are arranged along radii originating from the center of the rotatable member 40, such center coinciding with the point P.

The end of each obturating member 50 opposite the tip 56 has a recess 58, complementary to the thickness or cross-section of the profiles 52. Each recess 58 is snugly slidably mounted astride a respective profile 52.

In the figures, by way of example, the recesses 58 and the profiles 52 have a rectangular cross-section.

It follows that a rotation of the rotatable member 40 entails the relative sliding of the profiles 52 in the recesses 58, and the decreasing distance from the X axis of the edges of the profiles 52 progressively pushes the obturators 50 towards the convergence point P (closing phase of the nozzle 26). A rotation of the rotatable member 40 in the opposite direction causes the obturators 50 to recede from the convergence point P (opening phase of the nozzle 26).

Preferably the profiles 52 are all equal so as to transmit the same movement dynamics to each obturating member 50 and synchronously move the obturating members 50.

Various means may be used to rotate the rotatable member 40.

A preferred embodiment (FIG. 3) envisages that the rotatable member 40 has a radial slot 62 into which the head 66 of an arm 60 is insertable. The head 66 is pivoted in the radial slot 62 about an axis parallel to the X axis via a pin 65, and the arm 60 is arranged approximately along a straight line tangential to the perimeter of the rotatable member 40. The arm 60 is slidable back and forth (see arrow F in FIG. 2), moved directly or indirectly, through the interposition of further mechanical components capable of transforming or directing the supplied movement, e.g. by an electric motor or a pneumatic or hydraulic actuator. The reciprocating movement of the arm 60 forces the rotation of the rotatable member 40 in two opposite directions, clockwise or anti-clockwise (opening and closing phase respectively).

The number and arrangement of the obturating members 50 may vary from what is illustrated. In particular, the base of said pyramid (FIG. 1) may be any (preferably regular) polygon, and the geometric choice of the pyramid defines the position and number of the obturating members 50. There may also be only two obturating members 50 (placed in diametrically opposite positions) movable along the sides of an angle with vertex at the point P, where the lying plane of the angle may be orthogonal to the X axis or passing through the X axis.

The nozzle may be circular or have a different cross-section, for example rectangular or other polygonal shape.

The invention claimed is:

1. An obturation valve for controlling a flow of molten material exiting from a nozzle into a mold cavity, comprising:

a channel for the molten material extending along a first axis, two or more obturating members that are each mounted movably along a distinct, respective axis inclined at an acute angle with respect to the first axis and so that a free end of each obturating member can move and converge towards a same point inside the channel, so that the free ends of the obturating members can join at said point to compose a blocking/closing bulkhead for the molten material.

2. Valve according to claim 1, wherein the obturating members are linearly movable.

3. Valve according to claim 1, comprising only two obturating members, whose respective axes are arranged as adjacent sides of a triangle, said point forming a vertex of the two sides of the triangle and said triangle lying in a plane passing through the first axis.

4. Valve according to claim 1, comprising three or more obturating members whose respective axes are arranged like the sides of an imaginary pyramid, said point forming the vertex of the pyramid.

5. Valve according to claim 4, wherein said imaginary pyramid is arranged so that its base intersects the first axis and the channel.

6. Valve according to claim 1, comprising:

a rotatable member placed near the nozzle and which extends around and surrounds the first axis and the channel, and a portion of one or each obturating member is directly coupled to the rotatable member such that a rotation of the rotatable member entails a translation of the obturating member along the second axis from and/or toward said point.

7. Valve according to claim 6, wherein the rotatable member comprises a profile to which said portion is slidably coupled, the profile having a development which converts a rotation of the rotatable member into a translation of the obturating member.

8. Valve according to claim 6, wherein the rotatable member is rotatably mounted on a stationary member which is mounted in or on the mold.

9. Valve according to claim 8, wherein the fixed member comprises a surface forming a portion of the mold cavity.

10. Valve according to claim 9, wherein the fixed member is a one-piece body in which sliding channels are made for the obturating members, or is composed of two matching parts coupled along a joining surface, on the joining surface being provided seats or channels for the linear translation of the obturating members.

11. Valve according to claim 2, comprising only two obturating members, whose respective axes are arranged as the adjacent sides of a triangle, said point forming the vertex of the two sides of the triangle and said triangle lying in a plane passing through the first axis.

12. Valve according to claim 2, comprising three or more obturating members whose respective axes are arranged like the sides of an imaginary pyramid, said point forming the vertex of the pyramid.

13. Valve according to claim 12, wherein said imaginary pyramid is arranged so that its base intersects the first axis and the channel.

14. Valve according to claim 7, wherein the rotatable member is rotatably mounted on a stationary member which is mounted in or on the mold.

15. Valve according to claim 14, wherein the fixed member comprises a surface forming a portion of the mold cavity.

16. Valve according to claim 15, wherein the fixed member is a one-piece body in which sliding channels are made for the obturating members, or is composed of two matching parts coupled along a joining surface, on the joining surface being provided seats or channels for the linear translation of the obturating members.

* * * * *